(12) United States Patent
Sawai et al.

(10) Patent No.: US 7,418,677 B2
(45) Date of Patent: Aug. 26, 2008

(54) METHOD OF CALCULATING PREDICTIVE SHAPE OF WIRE STRUCTURE, CALCULATION APPARATUS, AND COMPUTER-READABLE RECORDING MEDIUM

(75) Inventors: Masayoshi Sawai, Kosai (JP); Yoshihiro Inoue, Kosai (JP)

(73) Assignee: Yazaki Corporation, Tokyo (JP)

( * ) Notice: Subject to any disclaimer, the term of this patent is extended or adjusted under 35 U.S.C. 154(b) by 380 days.

(21) Appl. No.: 11/174,579

(22) Filed: Jul. 6, 2005

(65) Prior Publication Data

US 2006/0020434 A1 Jan. 26, 2006

(30) Foreign Application Priority Data

Jul. 9, 2004 (JP) ............... P2004-202966

(51) Int. Cl.
G06F 17/50 (2006.01)
(52) U.S. Cl. .................................. 716/4; 716/5
(58) Field of Classification Search .......... 716/2, 716/4–6, 18, 1
See application file for complete search history.

(56) References Cited

U.S. PATENT DOCUMENTS

| 7,124,069 | B2 * | 10/2006 | Meuris et al. ............. 703/13 |
| 7,133,810 | B2 * | 11/2006 | Butler et al. ............. 703/2 |
| 7,206,723 | B2 * | 4/2007 | Sawai et al. ............. 703/1 |
| 2005/0203663 | A1 * | 9/2005 | Sawai ................... 700/182 |

FOREIGN PATENT DOCUMENTS

| EP | 1 130 527 A2 | 9/2001 |
| EP | 1 403 146 A2 | 3/2004 |
| EP | 1 426 886 A2 | 6/2004 |
| JP | 2001-250438 A | 9/2001 |
| JP | 2002-231074 A | 8/2002 |
| JP | 2002-373533 A | 12/2002 |
| JP | 2003-22720 A | 1/2003 |
| JP | 2003-22721 A | 1/2003 |
| JP | 2003-141197 A | 5/2003 |
| JP | 2003-141949 A | 5/2003 |
| JP | 2003-151383 A | 5/2003 |
| JP | 2004-139974 A | 5/2004 |

OTHER PUBLICATIONS

Hillerin De C-A: "Use of the Fem for the Design of Flexible Parts", Proceedings of Nafems World Congress, XX, XX, vol. 1, Apr. 25, 1999, pp. 345-356, XP009052130.

* cited by examiner

Primary Examiner—Jack Chiang
Assistant Examiner—Binh Tat
(74) Attorney, Agent, or Firm—Sughrue Mion, PLLC

(57) ABSTRACT

A calculating apparatus includes a finite element model creating unit that creates a finite element model of the wire structure, a setting unit that sets physical properties, restriction conditions and loads of the wire structure to the finite element model, a predictive shape calculating unit that calculates a predictive shape of the finite element model in a physically balanced condition, an outputting unit that outputs the predictive shape of the finite element model, a load calculating unit that calculates the loads which are applied to the respective joints of the finite element model, a displacing unit that displaces a predetermined control point on the finite element model. The predictive shape calculating unit calculates the predictive shape of the finite element model in which the control point is displaced, based on the loads applied to the finite element model prior to the displacement of the control point.

9 Claims, 9 Drawing Sheets

FIG. 2

| DEGREE OF FREEDOM OF RESTRICTIONS / SUPPORT MEMBER | | TRANSLATION IN THE DIRECTION OF X-AXIS | TRANSLATION IN THE DIRECTION OF Y-AXIS | TRANSLATION IN THE DIRECTION OF Z-AXIS | ROTATION AROUND X-AXIS | ROTATION AROUND Y-AXIS | ROTATION AROUND Z-AXIS |
|---|---|---|---|---|---|---|---|
| COMPLETE RESTRICTION | CONNECTOR | IMPOSSIBLE | IMPOSSIBLE | IMPOSSIBLE | IMPOSSIBLE | IMPOSSIBLE | IMPOSSIBLE |
| COMPLETE RESTRICTION | ELONGATED HOLE CLIP | IMPOSSIBLE | IMPOSSIBLE | IMPOSSIBLE | IMPOSSIBLE | IMPOSSIBLE | IMPOSSIBLE |
| ROTARY RESTRICTION | ROUND HOLE CLIP | IMPOSSIBLE | IMPOSSIBLE | IMPOSSIBLE | IMPOSSIBLE | IMPOSSIBLE | POSSIBLE |
| ROTARY RESTRICTION | CORRUGATED ELONGATED HOLE CLIP | IMPOSSIBLE | IMPOSSIBLE | IMPOSSIBLE | POSSIBLE | IMPOSSIBLE | IMPOSSIBLE |
| ROTARY RESTRICTION | CORRUGATED ROUND HOLE CLIP | IMPOSSIBLE | IMPOSSIBLE | IMPOSSIBLE | POSSIBLE | IMPOSSIBLE | POSSIBLE |
| COMPLETE RESTRICTION | BRANCH POINT | POSSIBLE | POSSIBLE | POSSIBLE | POSSIBLE | POSSIBLE | POSSIBLE |

FIG. 3A
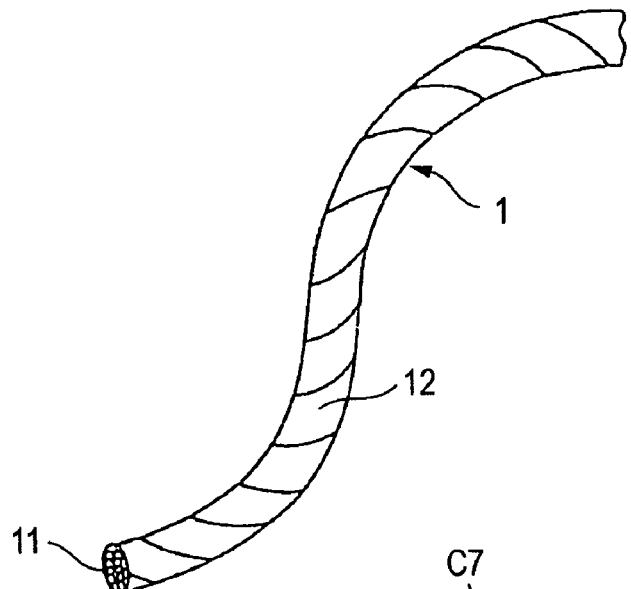
FIG. 3B
FIG. 3C
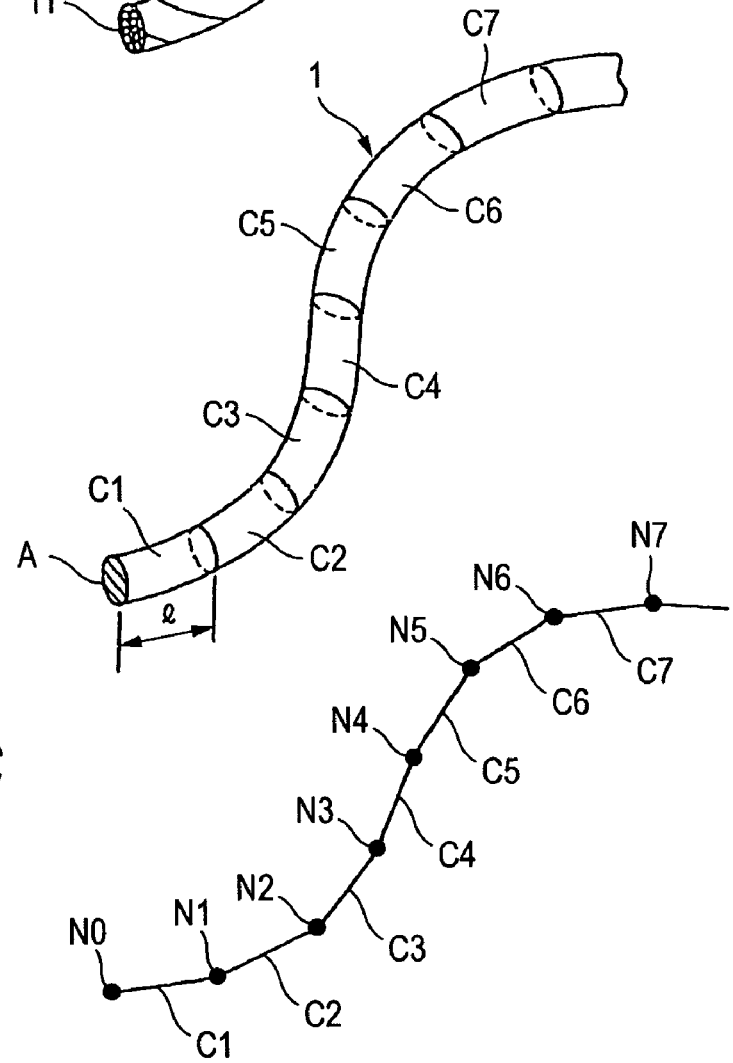

FIG. 6A
FIG. 6B
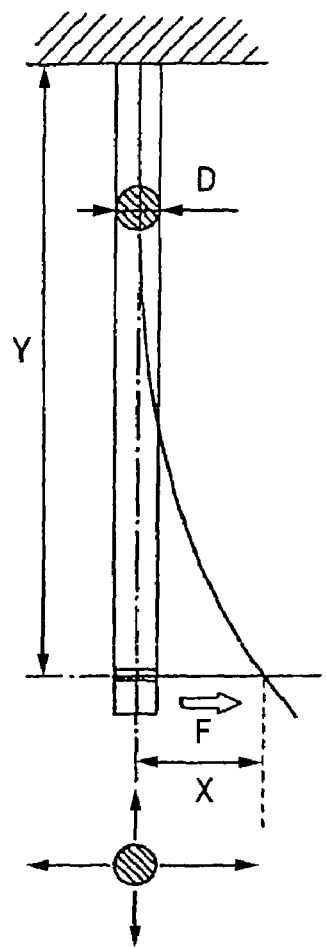
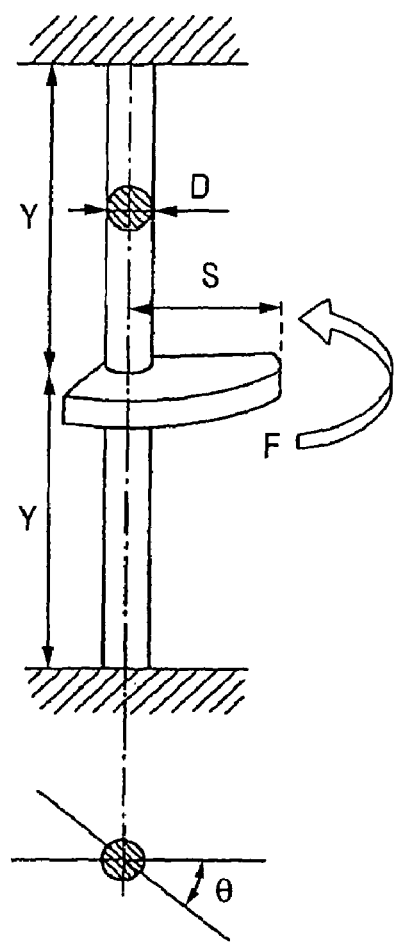

METHOD OF CALCULATING PREDICTIVE SHAPE OF WIRE STRUCTURE, CALCULATION APPARATUS, AND COMPUTER-READABLE RECORDING MEDIUM

BACKGROUND OF THE INVENTION

The present invention relates to a method of calculating a predictive shape of a wire structure for supporting a wiring design of the wiring structure, a calculation apparatus, and a computer-readable recording medium storing program for supporting the wiring design of the wiring structure such as a wiring harness.

In vehicles or the like, a plurality of electric parts and systems are installed, and these electric parts and systems are connected by so-called wiring harnesses which are wiring structures in which filament materials such as electric wires and communication lines are bundled up by bundling members such as an insulation lock or sheathing members such as tapes. As shown in FIG. 1, a wiring harness 1 has connectors $2a$, $2b$, $2c$, $2d$, which are adapted to be connected to electric parts and systems, mounted on respective end portions thereof. In addition, various types of clips $3a$, $3b$, $3c$, $3d$ are mounted at intermediate portions of the wiring harness 1, and furthermore, the wiring harness 1 has a branch point 4. Note that respective constituent branch wires of the wiring harness 1 vary from one another in thickness, length, elasticity, density and the like due to constituent filament materials of the branch wires being different in number and kind.

Recently, to design a layout of such wiring harnesses on a vehicle or the like, in many cases, general purpose analytic software such as CAD (Computer Aided Design) and CAE (Computer Aided Engineering) has been used for computation, or engineers have used their experience and perception or sixth sense. However, there are many kinds and forms of wiring structures such as wiring harnesses, and therefore, it has been very difficult to design a layout of wiring harnesses while accurately estimating parameters including rigidities with respect to bending and twisting occurring at respective portions of the wiring harnesses only by depending upon the general purpose analytic software and the engineers' experience.

Then, the applicant of this patent application enabled the computation of a predictive shape of a wiring structure such as a wiring harness in consideration of physical characteristics of the wiring structure, that is, the material and rigidity with respect to bending and twisting occurring at respective portions of the wiring structure by making use of a finite element method disclosed in the following patent document No. 1, whereby the applicant proposed a method for supporting an optimum wiring design.

Here, documents that are referred to in this specification are as follows.

[Patent Document No. 1] JP-A-2004-139974

[Non-Patent Document No. 1] Matrix Finite Element Method (Pages 7 to 15) written by B. Nass and published on Aug. 10, 1978 by Brain Books Publishing Co., Ltd.

[Non-Patent Document No. 2] Building Structures Analysis Series II Analysis of Frame Structures (Pages 176 to 185) written by Shinya Tanishi and published on Dec. 20, 1976 by GIHODO SHUPPAN Co., Ltd.

While a method of JP-A-2004-139974 is superior in that a predictive shape of a wiring structure can accurately be computed in consideration of physical properties of the wiring structure, that is, the material and rigidity with respect to bending and twisting at respective portions of the wiring structure, it has been found that there still remains a room for further improvement.

Namely, since the method of JP-A-2004-139974 is such as to compute a predictive shape of the wiring structure by giving not only the physical characteristics of the wiring structure but also positions of a plurality of displacement destinations as restrictions to a finite element model, it has occurred depending on cases that a predictive shape cannot be computed accurately. For example, as shown in FIGS. 9A to 9C, assuming that a control point $1a8$ of an initial shape of a wiring harness in which $1a0$ constitutes a fixed point is displaced to $1z8$ via $1b8$ and $1c8$ while avoiding an obstacle 30, it is understood that a shape $1b$ becomes a shape in which an influence of a stress (broadly speaking, referred to as a load) distributed in a shape $1a$ is reflected, and similarly, a shape $1c$ becomes a shape in which a stress distributed in the shape $1b$ is reflected, and a shape $1z$ becomes a shape in which a stress distributed in the shape $1c$ is reflected.

In the method of JP-A-2004-139974, however, since no computation is made in consideration of the influence of the stresses or loads distributed in the previous shapes, a further improvement is demanded in order to compute a predictive shape which is more realistic.

SUMMARY OF THE INVENTION

Consequently, in view of these current situations, an object of the invention is to provide a method of calculating a predictive shape of a wiring structure for supporting a wiring design, a calculation apparatus, and a computer-readable recording medium storing program for supporting the wiring design of the wiring structure which can compute a more realistic predictive shape of a wiring structure by taking into consideration the stresses or loads on the previous shapes of the wiring structure.

In order to achieve the above object, according to the present invention, there is provided a method of calculating a predictive shape of a wire structure, comprising:

providing a finite element model of the wire structure, the finite element model being formed as an elastic body having a plurality of linearity beam elements combined at respective joints;

setting physical properties, restriction conditions and loads of the wire structure to the finite element model;

calculating a predictive shape of the finite element model which is in a physically balanced condition based on the physical properties, the restriction conditions and the loads;

outputting the predictive shape of the finite element model;

calculating the loads which are applied to the respective joints of the finite element model at the predictive shape; and displacing a predetermined control point on the finite element model, wherein the predictive shape of the finite element model, in which the control point is displaced, is calculated based on the loads applied to the finite element model prior to the displacement of the control point in the predictive shape calculating process.

Preferably, the control point is forcibly displaced by a predetermined quantity in the displacement process.

Preferably, the control point is displaced by applying a predetermined force to the control point in the control displacement process.

Preferably, the method further includes a step of obtaining initial loads which are the loads applied to respective joints on a finite element model corresponding to an initial shape of the wiring structure. The predictive shape of the finite element model, in which the control point is displaced, is calculated based on the initial loads in the predictive shape calculating process.

According to the present invention, there is also provided A calculating apparatus for calculating a predictive shape of a wire structure, comprising:

a finite element model creating unit that creates a finite element model of the wire structure, the finite element model being formed as an elastic body having a plurality of beam elements combined at respective joints linearity;

a setting unit that sets physical properties, restriction conditions and loads of the wire structure to the finite element model;

a predictive shape calculating unit that calculates a predictive shape of the finite element model which is in a physically balanced condition based on the physical properties, the restriction conditions and the loads;

an outputting unit that outputs the predictive shape of the finite element model;

a load calculating unit that calculates the loads which are applied to the respective joints of the finite element model at the predictive shape; and a displacing unit that displaces a predetermined control point on the finite element model, wherein the predictive shape calculating unit calculates the predictive shape of the finite element model in which the control point is displaced, based on the loads applied to the finite element model prior to the displacement of the control point.

A computer-readable recording medium for causing a computer to execute the method of calculating a predictive shape of a wire structure set forth in above methods.

According to the above method and calculation apparatus, the finite element model of the wiring structure is prepared by regarding the wiring structure of interest as an elastic structure including a plurality of connected beam elements in each of which the linearity is maintained, the predictive shape of the finite element model in which the model is balanced physically is calculated according to the physical characteristics, restriction conditions and loads of the wiring structure given to the model, and the predictive shape is outputted. In particular, the predictive shape resulting before the control point is forcibly displaced or displaced while a force is being applied thereto is obtained. Consequently, it is possible to compute a more realistic predictive shape of the wiring structure.

In addition, since the predictive shape is calculated based on the load in the initial shape, a bending tendency existing in a wiring structure at the time of shipment can also be considered. Consequently, it is possible to compute a predictive shape of the wiring structure which is realistic further.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a drawing showing a relationship between representative support members that are mounted on the wiring harness and degrees of freedom and restrictions;

FIG. 3A is a drawing showing an external view of the wiring harness, FIG. 3B is a drawing showing how the wiring harness shown in FIG. 3A is discretized, and FIG. 3C is a drawing which represents the wiring harness shown in FIG. 3A by beam elements and nodes;

FIG. 6A is a drawing which shows how a moment of inertia of area and a longitudinal elastic modulus are measured and FIG. 6B is a drawing which shows how a polar moment of inertia of area and a lateral elastic modulus are measured;

DETAILED DESCRIPTION OF THE PREFERRED EMBODIMENTS

Figure 1:
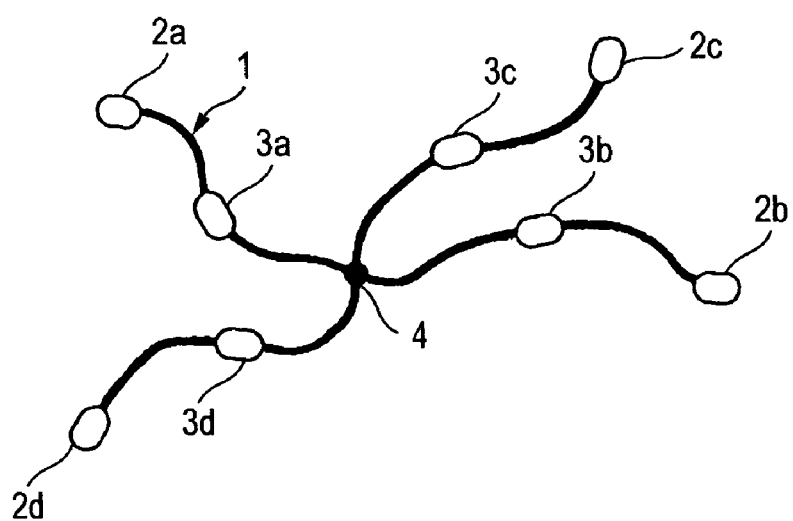
FIG. 1 is a drawing which schematically shows an example of a wiring harness of interest.

The embodiments of the present invention will now be described on the basis of the drawings. First, an example of a wire harness as an object linear structure and a typical support member will be described in FIG. 1 and FIG. 2. FIG. 1 is a drawing schematically showing an example of an object wire harness. FIG. 2 is a diagram showing the relation between typical support members fixed to the wire harness and the degree of freedom of restrictions.

Connectors 2a, 2b, 2c, 2d for connecting electric parts (not shown) are mounted at both end portions of the wire harness 1. Various kinds of clips 3a, 3b, 3b, 3c are mounted to intermediate portions of the wire harness 1, which further has a branch point 4. Since the branch lines of the wire harness 1 have basically different number and kind of structural filament members, the thickness, length, elasticity, density and the like thereof are also different.

The connectors 2a, 2b, 2c, 2d are detachably joined to fixed portions and predetermined portions, which are in accordance with the part fixing direction, of connectors on the side of an electric part, and the end portions of the wire harness are thereby completely restricted. The clips 3a, 3b, 3c, 3e completely restrict or rotationally restrict predetermined portions of the wire harness with respect to predetermined portions of a body and a stay of a vehicle.

A description of the clips will now be added. The clips basically include an elongated hole clip, and a round hole clip. A round hole clip is also called a rotary clip, and has a base seat portion for retaining the wire harness, and a support leg inserted into a round fixing hole provided in a stay and the like. The round hole clip can be rotated around a Z-axis (perpendicular direction of a fixing portion).

The elongated hole clip is also called a fixed clip, and has a base seat portion for retaining the wire harness, and a support leg inserted into an elongated fixing hole provided in a stay and the like. This support leg has an elongated hole-like cross-sectional shape substantially identical with the cross-sectional shape of the fixing hole. The elongated hole clip is non-rotatable around the Z-axis.

The elongated hole clips and round hole clips include corrugated elongated hole clips rotatable around an X-axis (longitudinal direction of the wire harness), and corrugated round hole clips. The degrees of freedom of restriction in the axial directions and in the directions around the axes of such clips are as shown in FIG. 2.

Referring to FIG. 2, the X-axis, Y-axis and Z-axis correspond to three straight lines in a right-hand local coordinate system on joints (or called nodes as well) on the wire harness. For example, the Z-axis is set so that the Z-axis is in alignment with the clip axis. These setting methods can be changed suitably depending upon the functions in use. The drawing also shows for reference the degrees of freedom of restriction of the branch point. A joint, though it is not shown in the drawing, set arbitrarily on the portion of the wire harness which is other than the above-mentioned restriction point is basically completely free. Such a degree of freedom of restriction is set on each joint for making calculations of predictive paths which will be described later.

Figure 4:
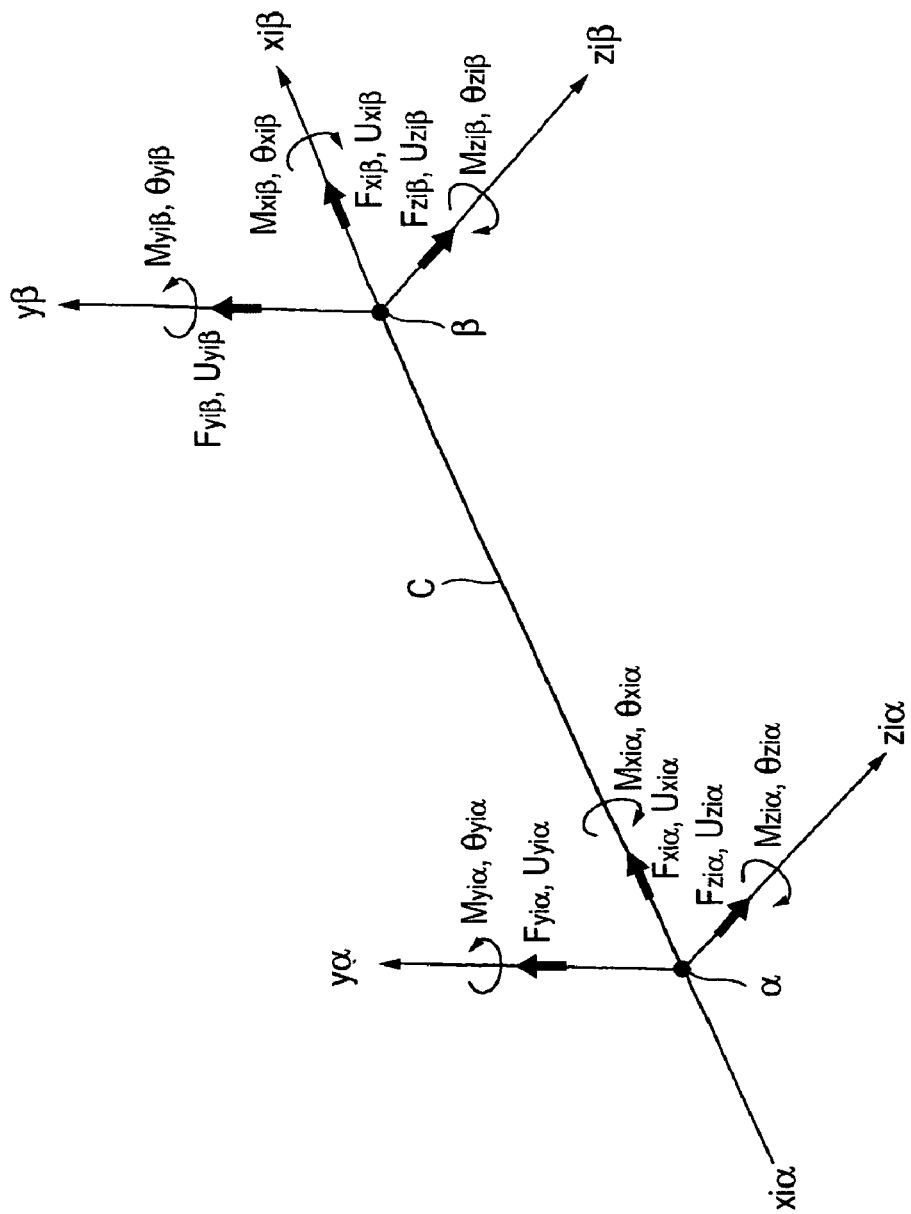
FIG. 4 is a drawing which explains degrees of freedom of the wiring harness that is represented by the beam elements and nodes.
Figures 5A, 5B:
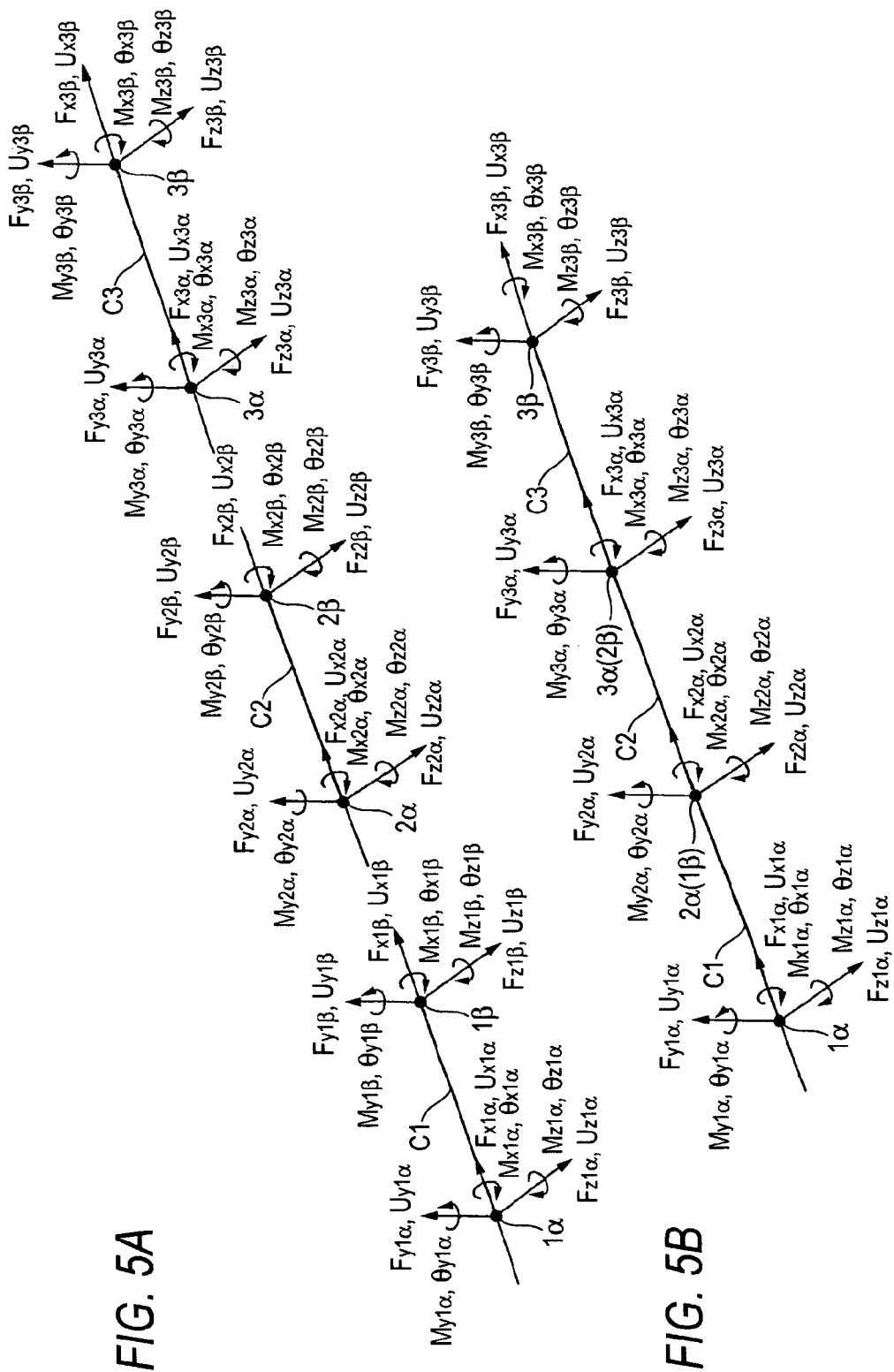
FIG. 5A is a drawing which represents the wiring harness by three beam elements.
FIG. 5B is a drawing showing a state in which the three beam elements shown in FIG. 5A are joined together.

Referring then to FIG. 3 to FIG. 5, the outlines of the hypothetic conditions constituting the premises of the present invention, theories utilized and basic equations will now be described. FIG. 3A is a drawing showing an external view of a wire harness, FIG. 3B a drawing showing a discrete condition of the wire harness of FIG. 3A, and FIG. 3C a drawing representing the wire harness of FIG. 3A by beam elements and joints. FIG. 4 is a drawing for describing the degree of freedom in the wire harness represented by beam elements and joints. FIG. 5A is a drawing representing the wire harness by three beam elements, and FIG. 5B a drawing showing the condition of the three beam elements of FIG. 5A combined together.

First, according to the present invention, the following hypotheses are built up under use of the finite element process for designing the wire harness.
(1) It is assumed that the wire harness is made of an elastic body.
(2) It is assumed that the wire harness is a combination of beam elements.
(3) It is assumed that each beam element retains the linearity.

Setting the wire harness hypothetically as beam elements means that the wire harness is also set hypothetically as a uniform cross section, i.e. a homogeneous cross section. The cross section is assumed to be circular but it is not always necessary to assume the cross section in this manner. However, in the following statement, a description will be given with the cross section of the wire harness assumed to be circular.

When such a hypothesis is formed, the applying of the finite element process to the wire harness, which has not heretofore been applied thereto, becomes possible.

First, the wire harness is discretized. The wire harness formed by binding a plurality of electric wires 11 by an armoring material, such as a tape 12 as shown in FIG. 3A can be regarded as a continuous body. As shown in FIG. 3B, such a wire harness 1 is divided (discretized) into some beam elements C1, C2, C3, .... Namely, the wire harness is like one rope, so that the wire harness can be regarded as finite pieces of connected beam elements.

Therefore, as shown in FIG. 3C, the wire harness can be expressed as a combination of a plurality of beam elements C1, C2, C3, ... connected to one another by a plurality of nodes N1, N2, N3, .... The characteristic values necessary for the beam elements are as follows.

Length l (refer to FIG. 3B)
Cross-sectional area A (refer to FIG. 3B)
Second moment of area I
Second polar moment of area J (also called torsional resistance coefficient)
Longitudinal elastic modulus E
Lateral elastic modulus G In order to determine these values, a density $\rho$ and a Poisson's ratio $\mu$, etc. are also used, though they are not directly shown in these characteristic values.

In the specification of the present invention, the parameters concerning the physical properties directly determining an outer shape of a linear structure are called outer shape parameters, and the parameters concerning the physical properties other than the outer shape parameters, such as the second moment of area I, polar moment of area J, longitudinal elastic modulus E and lateral elastic modulus G, density $\rho$, Poisson's ratio $\mu$, etc. shall be called non-outer shape parameters.

As shown in FIG. 4, each beam element (C1, C2, C3, ... ) has two nodes $\alpha$ and $\beta$. In the three-dimensional space, the node $\alpha$ has three translational components and three rotational components, so that the node has a total of six degrees of freedom. The same applies to the other node $\beta$. Therefore, the beam element C necessarily has twelve degrees of freedom.

Referring to the drawing, the following reference letters and symbols represent:

$F_{xi}$: Nodal force in an xi axial direction of i-th element
$F_{yi}$: Nodal force in a yi axial direction of i-th element
$F_{zi}$: Nodal force in a zi axial direction of i-th element
$M_{xi}$: End moment around the xi axis of the i-th element (the right-handed screwing direction shall be a positive direction)
$M_{yi}$: End moment around the yi axis of the i-th element (the right-handed screwing direction shall be a positive direction)
$M_{zi}$: End moment around the zi axis of the i-th element (the right-handed screwing direction shall be a positive direction)
$U_{xi}$: Displacement in the xi direction of the i-th element
$U_{yi}$: Displacement in the yi direction of the i-th element
$U_{zi}$: Displacement in the zi direction of the i-th element
$\ominus_{xi}$: Angular displacement around the xi axis of the i-th element (the right-handed screwing direction shall be a positive direction)
$\ominus_{yi}$: Angular displacement around the yi axis of the i-th element (the right-handed screwing direction shall be a positive direction)
$\ominus_{zi}$: Angular displacement around the zi axis of the i-th element (the right-handed screwing direction shall be a positive direction)

$\alpha$ represents a left side node, and the other $\beta$ a right side node.

In the structural mechanics accompanying such a large deformation as that of a wire harness and the like, a balance equation of a finite element process is generally $([K]+[K_G])\{x\}=\{F\}$ ... (1)

wherein [K] is a general rigidity matrix (a normal linear, elastic total rigidity matrix), [$K_G$] an overall geometric rigidity matrix (an initial stress matrix), {x} a displacement vector, and {F} a load vector (also called a force vector).

However, since the equation (1) is algebraically a nonlinear simultaneous equation, the equation cannot be solved as it is in a practical numerical analysis. Therefore, an incremental method in which a load value is fractionized and gradually added is necessarily employed (the same applies to a case where forced displacement occurs). In consequence, the balance equation (1) is also expressed by the following incremental system.

$$([K]+[K_G])\{\Delta x\}=\{\Delta F\})-(\int [B]^T \sigma_0 dV - \{F_0\}) \quad (1)'$$

wherein $\{\Delta F\}$ is a vector of load increment, $\{\Delta x\}$ is a vector of incremental deformation, and $[B]^T$ is a transposition of a strain-displacement matrix which is formed only by linear terms and represents a stress distribution status of an element, $\sigma_0$ is a stress that is being generated in a current load step (n step)(cross sectional force), $\int [B]^T \sigma_0 dV$ becomes a force that is generated at a node of an element through volume integral of a stress distributed in the element (also referred to as an internal force term), $\{F_0\}$ is a load vector that has been loaded until the current load step (also referred to as a loaded load vector), and $\int [B]^T \sigma_0 dV - \{F_0\}$ is a residual vector (a difference between an external force vector at the current load step and transmitted node force that is derived from a stress that is being generated by the external force vector).

Note that as to $\int [B]^T \sigma_0 dV$, since it has already been let known in the non-patent document No. 2, the description thereof will be omitted here.

In each incremental section, calculations are made with the balance equation regarded as a linear equation, and a non-balancing force ($\int [B]^T \sigma_0 dV - \{F_0\}$ in the equation (1)') occurring during this time is reduced to a level in a tolerance by a method of repetition before a subsequent step is taken. In a series of these algorithms, a known method, for example, a Newton-Raphson method and an arc length method are utilized.

When a forced displacement is designated as in the prediction of a shape, omitting the overall geometric rigidity matrix $[K_G]$ in a second item out of a left side of the balance equation, the results of a good quality are obtained in many cases. The overall geometric rigidity matrix is omitted in this case as well.

The overall rigidity matrix $[K]$ in a first item of a left side of the balance equation is obtained by converting the rigidity matrix of each element, which is rewritten as the coordinate value is changed momentarily in each incremental step, into a coordinate value in an overall coordinate system, and aggregating the values thus obtained. The concrete content of expression of the element rigidity matrix forming a basis is shown in the following equation (2).

The condition of compatibility and that of equilibrium will now be described. As shown in FIG. 5A, the wire harness shall be expressed by three beam elements C1, C2, C3 for simplicity's sake. In this case, the quantity of displacement of a node 1β of the beam element C1 and that of displacement of a node 2α of the beam element C2 become equal, and a force applied to these two nodes is also balanced. For the same reason, the quantities of displacement of the node 2β of the beam element C2 and node 3α of a beam element C3 also become equal, and a force applied to these two nodes is also balanced. Therefore, owing to the continuity of the displacement and the satisfaction of the condition of equilibrium, the beam elements C1 and C2, and the beam elements C2 and C3 can be combined with each other as shown in FIG. 5B.

Referring to the drawings, the following reference letters and symbols represent:

$F_{xi}$: Nodal force in the xi axial direction of the i-th element
$F_{yi}$: Nodal force in the yi axial direction of the i-th element
$F_{zi}$: Nodal force in the zi axial direction of the i-th element
$M_{xi}$: End moment around the xi axis of the i-th element
$M_{yi}$: End moment around the yi axis of the i-th element
$M_{zi}$: End moment around the zi axis of the i-th element
$U_{xi}$: Displacement in the xi axial direction of the i-th element
$U_{yi}$: Displacement in the yi axial direction of the i-th element
$U_{zi}$: Displacement in the zi axial direction of the i-th element
$\Theta_{xi}$: Angular displacement around the xi axis of the i-th element
$\Theta_{yi}$: Angular displacement around the yi axis of the i-th element
$\Theta_{zi}$: Angular displacement around the zi axis of the i-th element wherein i=1α, 1β, 2α, 2β, 3α, and 3β.

When the continuity of the displacement and the balance of force in the beam elements C1, C2 and C3 shown in FIG. 5B are shown in the same form as the above-mentioned equation (2), the following equation (3) is obtained.

$$\begin{pmatrix}
\frac{AE}{l} & 0 & 0 & 0 & 0 & 0 & -\frac{AE}{l} & 0 & 0 & 0 & 0 & 0 \\
0 & \frac{12EI_z}{l^3} & 0 & 0 & 0 & \frac{6EI_z}{l^2} & 0 & -\frac{12EI_z}{l^3} & 0 & 0 & 0 & \frac{6EI_z}{l^2} \\
0 & 0 & \frac{12EI_y}{l^3} & 0 & -\frac{6EI_y}{l^2} & 0 & 0 & 0 & -\frac{12EI_y}{l^3} & 0 & -\frac{6EI_y}{l^2} & 0 \\
0 & 0 & 0 & \frac{GJ}{l} & 0 & 0 & 0 & 0 & 0 & -\frac{GJ}{l} & 0 & 0 \\
0 & 0 & -\frac{6EI_y}{l^2} & 0 & \frac{4EI_y}{l} & 0 & 0 & 0 & \frac{6EI_y}{l^2} & 0 & \frac{2EI_y}{l} & 0 \\
0 & \frac{6EI_z}{l^2} & 0 & 0 & 0 & \frac{4EI_z}{l} & 0 & -\frac{6EI_z}{l^2} & 0 & 0 & 0 & \frac{2EI_z}{l} \\
-\frac{AE}{l} & 0 & 0 & 0 & 0 & 0 & \frac{AE}{l} & 0 & 0 & 0 & 0 & 0 \\
0 & -\frac{12EI_z}{l^3} & 0 & 0 & 0 & -\frac{6EI_z}{l^2} & 0 & \frac{12EI_z}{l^3} & 0 & 0 & 0 & -\frac{6EI_z}{l^2} \\
0 & 0 & -\frac{12EI_y}{l^3} & 0 & \frac{6EI_y}{l^2} & 0 & 0 & 0 & \frac{12EI_y}{l^3} & 0 & \frac{6EI_y}{l^2} & 0 \\
0 & 0 & 0 & -\frac{GJ}{l} & 0 & 0 & 0 & 0 & 0 & \frac{GJ}{l} & 0 & 0 \\
0 & 0 & -\frac{6EI_y}{l^2} & 0 & \frac{2EI_y}{l} & 0 & 0 & 0 & \frac{6EI_y}{l^2} & 0 & \frac{4EI_y}{l} & 0 \\
0 & \frac{6EI_z}{l^2} & 0 & 0 & 0 & \frac{2EI_z}{l} & 0 & -\frac{6EI_z}{l^2} & 0 & 0 & 0 & \frac{4EI_z}{l}
\end{pmatrix}
\begin{Bmatrix} U_{xi\alpha} \\ U_{yi\alpha} \\ U_{zi\alpha} \\ \theta_{xi\alpha} \\ \theta_{yi\alpha} \\ \theta_{zi\alpha} \\ U_{xi\beta} \\ U_{yi\beta} \\ U_{zi\beta} \\ \theta_{xi\beta} \\ \theta_{yi\beta} \\ \theta_{zi\beta} \end{Bmatrix}
= \begin{Bmatrix} F_{xi\alpha} \\ F_{yi\alpha} \\ F_{zi\alpha} \\ M_{xi\alpha} \\ M_{yi\alpha} \\ M_{zi\alpha} \\ F_{xi\beta} \\ F_{yi\beta} \\ F_{zi\beta} \\ M_{xi\beta} \\ M_{yi\beta} \\ M_{zi\beta} \end{Bmatrix} \quad (2)$$

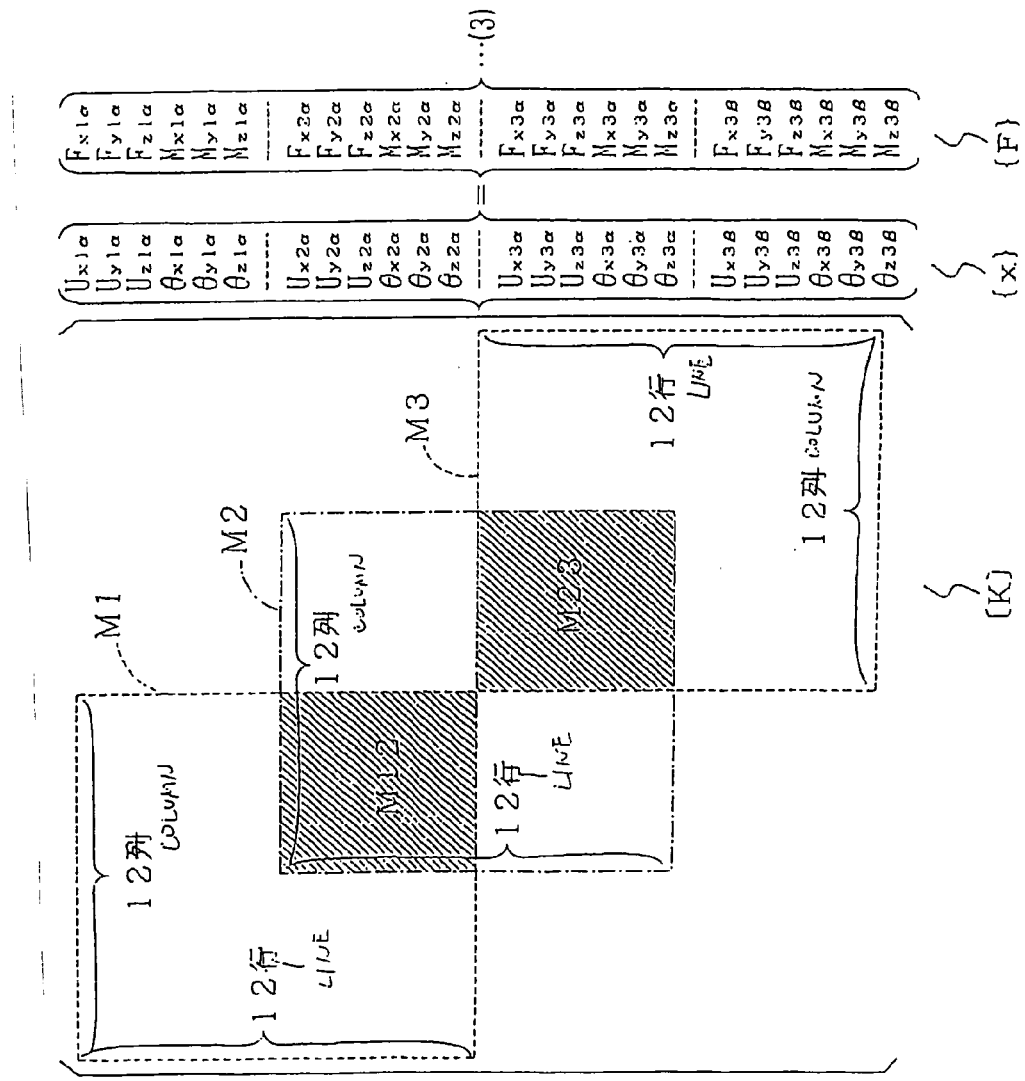

The matrixes M1, M2 and M3 on a line 12 and a column 12 in the equation (3) are the same as that shown in the above equation (2). However, the portions M12 and M23 in which the matrixes M1, M2 and M3 overlap each other are portions in which the structural elements of the matrixes are summed up.

Not smaller than four beam elements can also be handled in the same manner. Thus, a mathematical model of a wire harness divided into an arbitrary number of beam elements can be made.

When the above equation (3) is expressed simply, it becomes [K] {x}={F} . . . (4)

Therefore, a path, i.e. a predictive shape of the wire harness can be calculated by determining each element of the displacement vector {x} on the basis of the above equations (3) and (4). The distortion, stress, a reaction force, moment and so forth can be calculated by determining a force vector {F} in each node. The general matrix finite element process as mentioned above is also introduced in, for example, the above-mentioned in the publication "Matrix Finite element process".

One example of the method of determining a Poisson's ratio, a longitudinal elastic modulus and a lateral elastic modulus which are necessary for the prediction of the shape in the present invention will now be described below. FIG. 6A is a drawing showing the measurement of geometrical moment of inertia and a longitudinal elastic modulus, and FIG. 6B a drawing showing the measurement of a polar moment of area and a lateral elastic modulus.

First, an object wire harness is prepared, and the length l, a cross-sectional area A and a density ρ are determined with calipers, a measure, a gravimeter and the like. The values can then be obtained by simple calculations.

When the longitudinal elastic modulus E is measured by using the measuring method shown in FIG. 6A, the result can be expressed by the following equation (5).

$$E = FL^3/3XI \quad (5)$$

The geometrical moment of inertia can be expressed by the following equation (6) since it was assumed that the wire harness had a circular cross section as mentioned above.

$$I = \pi D^4/64 \quad (6)$$

Therefore, the equation becomes:

$$E = 64FL^3/3X\pi D^4 \quad (7)$$

In this measurement, the longitudinal elastic modulus E can be determined by measuring the relation between F and x with $E=(F/X)\times(64L^3/3\pi D^4)$.

When the lateral elastic modulus G is determined by using the measuring method shown in FIG. 6B, the result can be expressed by the following equation (8).

$$G = (TL/\ominus) \times 2 \quad (8)$$

The polar moment of area J can be expressed by the following equation (9) since it was assumed that the wire harness had a circular cross section.

$$J = \pi D^4/32 \quad (9)$$

The torsional force becomes:

$$T = FS \quad (10)$$

Therefore, $$G = (32FSL/\ominus\pi^4)\times 2 = (F/\ominus)(32SL/\pi D^4)\times 2 \quad (11)$$

Accordingly, the lateral elastic modulus G can be determined by measuring the relation between F and ⊖.

The lateral elastic modulus and longitudinal elastic modulus have the relation shown by the following equation (12).

$$G = E/2(1+\mu) \quad (12)$$

wherein μ is a Poisson's ratio.

The above-mentioned measuring method is an example, and each of the lateral elastic modulus G and longitudinal elastic modulus E may also be obtained by a method other than this example of the measuring method.

Figure 7:
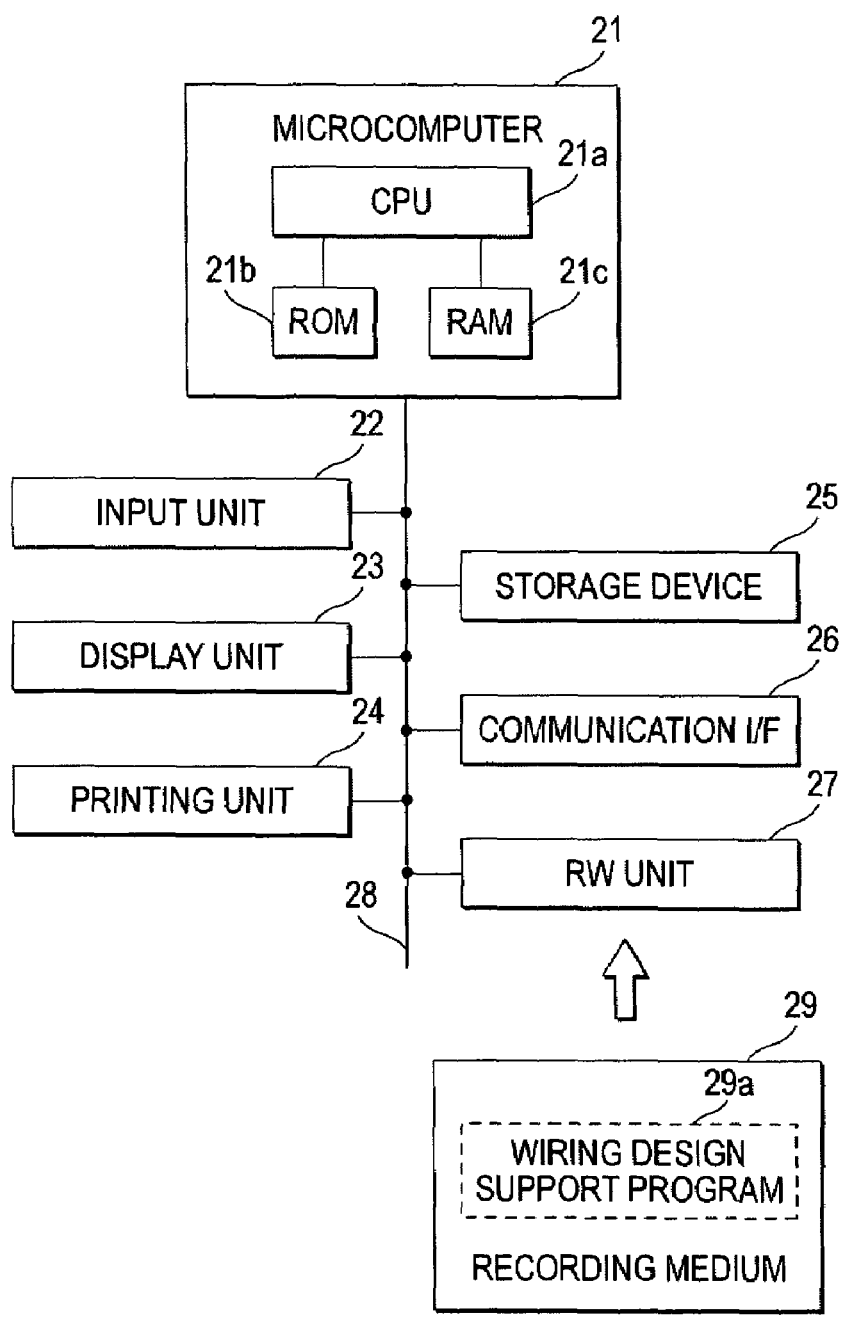
FIG. 7 is a block diagram illustrating an example of the configuration of hardware according to all embodiments of the invention.

The supporting of the design is then done by calculating a predictive shape of the wire harness in accordance with a processing procedure, which will be described later, by utilizing the above theory, basic equations and measurement values. The construction of the hardware in the present invention will be described. FIG. 7 is a block diagram showing the construction of the hardware in all of the modes of embodiments of the present invention.

As shown in FIG. 7, the apparatus according to the present invention includes a microcomputer 21, an input unit 22, a display 23, a printing unit 24, a storage device 25, a communication interface 26 and a read/write unit 27. For example, a personal computer is used. Needless to say, a desk top computer and a supercomputer which are other than the personal computer may also be used. The microcomputer 21 includes a CPU 21a (Central Processing Unit), a ROM 21b for storing a boot program, etc., and a RAM 21c for temporarily storing the results of various kinds of processing operations. The input unit 22 is a keyboard, a mouse and the like for inputting the mentioned various values thereinto, the display 23 is a LCD, a CRT and the like for displaying the results of processing operations, and the printing unit 24 a printer for printing the results of processing operations.

The storage device 25 stores a wiring design support program 29a, i.e. a hard disk drive for storing the results of a process based on this program 29a, while the communication interface 26 is a modem board and the like for making data communication between the communication interface and an external unit by using, for example, internet and a LAN circuit and the like. The read/write unit 27 is a device for reading the wiring design support program 29a stored in a recording medium 29, such as a CD and a DVD, and write the calculation results based on this wire design support program 29a in the recording medium 29. These structural elements are connected together via an inner bus 28.

The microcomputer 21 installs the wire design support program 29a, which is read by the read write device 27, in the storage device 25. When a power supply is turned on, the microcomputer 21 is started in accordance with the boot program stored in the ROM 21b and boots the wire design support program 29a. Then, in accordance with the wire design support program 29a, the microcomputer 21 performs processing for shape prediction taking into account an obstacle, causes the display device 23 and the printing device 24 to output results of the processing, and causes the storage device 25 and the recording medium 29 to stores the results of the processing. The wire design support program 29a may be installed in other personal computers and the like having the basic structure described above. After the installation, the wire design support program 29a causes the computers as wiring design support apparatuses. Note that the wire design support program 29a is not limited to the recording medium 29 but may be a program provided through a communication line such as the Internet or a LAN.

Figure 8:
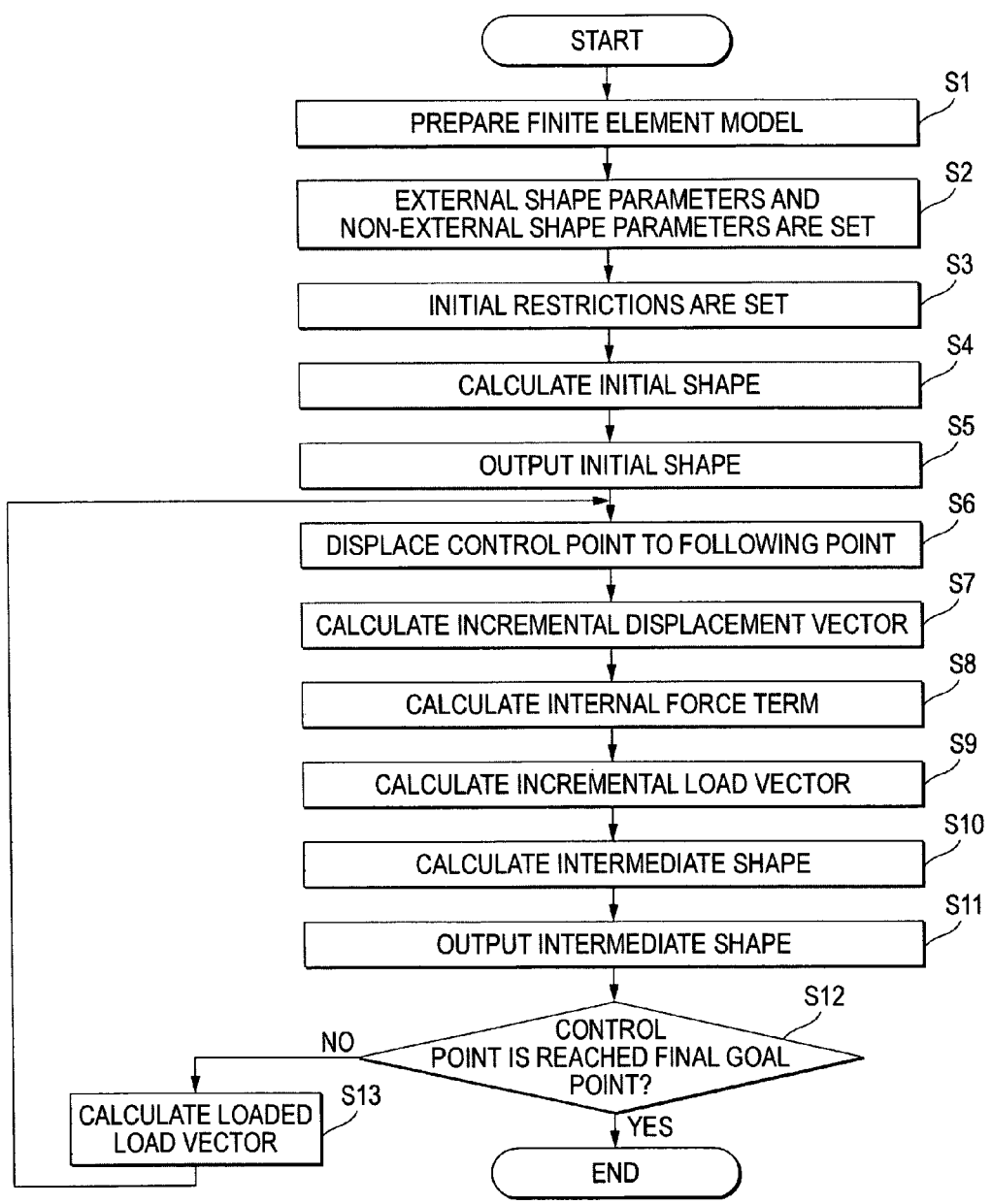
FIG. 8 is a flowchart illustrating a processing procedure according to an embodiment of the invention.
Figure 9A:
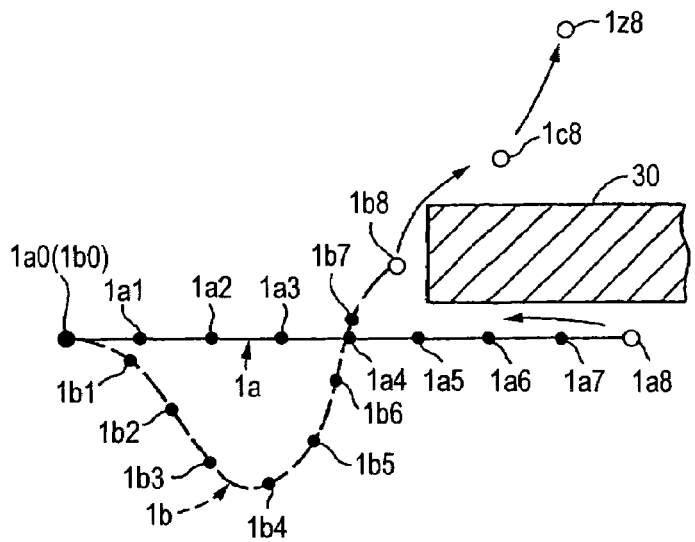
FIG. 9A to 9C are drawings which illustrate how the wiring harness is strained in the respective processing steps in FIG. 8.
Figure 9B:
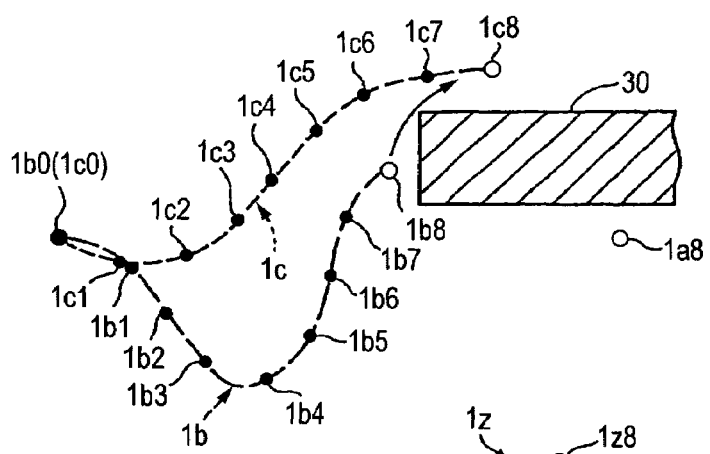
Figure 9C:
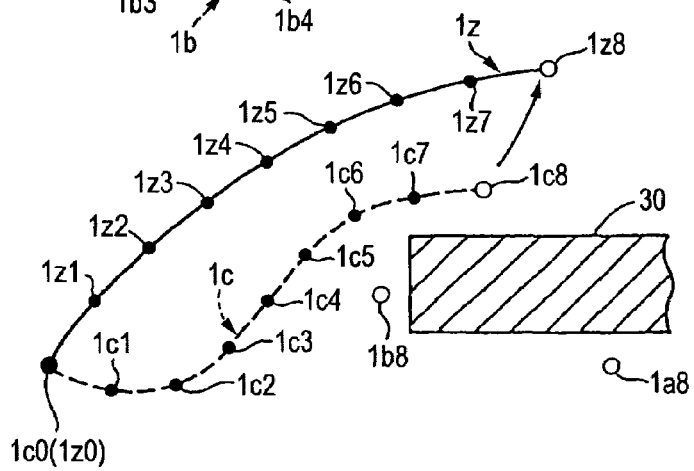

A processing procedure according to an embodiment of the invention will be explained using FIGS. 8 and 9A to 9C. FIG. 8 is a flowchart showing the processing procedure according to the embodiment of the invention. FIGS. 9A to 9C are diagrams showing a state in which a wire harness deforms in respective processing steps in FIG. 8.

Firstly, in step S1 shown in FIG. 8, the microcomputer 21 prepares a finite element model which corresponds to a wiring harness of interest for design as shown in FIG. 9A using the above method. A finite element model is made up of, for example, a plurality of beam elements having nodes 1a0 to 1a8 as shown by 1a in the figure. The respective nodes 1a0 to 1a8 are assumed to be allocated at equal intervals. When attempting to express using a formula, the finite element model can be expressed by the expression (1)'.

Next, in step S2, external shape parameters and non-external shape parameters are set for the wiring harness of interest for design. The length l and the cross section A are set as the external shape parameters, and as the non-external shape parameters, the moment of inertia of area I, the polar moment of inertia of area J, Poisson ration $\mu$, the density $\rho$, the longitudinal elastic modulus E and the lateral elastic modulus G are set. As described above, values that have been measured or obtained in advance are used for these parameters. Values to be set here are in relation to each element in the rigidity matrix [K] in the expression (1)'. The external shape parameters and the non-external shape parameters correspond to the physical characteristics. Note that while not shown, various types of control values in relation to this computation are also set.

Next, in step S3, initial restriction conditions are set for the finite element model so prepared by making use of the input unit 22 and the like and are then captured into the microcomputer 21. The initial restriction conditions that are to be set in this step are those corresponding to an arbitrary initial shape. The kinds of restrictions (complete restriction, rotatable restriction, completely free) and coordinates shown in FIG. 2 are set for the respective nodes 1a0 to 1a8 as the restriction conditions that are to be set here. Locations where support members such as connectors and clips are mounted are allocated as the respective nodes 1a0 to 1a8. Note that the names of support members such as connectors, fixing clips and the like may be used for setting the kinds of restrictions as shown in FIG. 2. Respective values that are to be set here are in relation to the respective elements in the vector $\{\Delta x\}$ in the expression (1)'.

To be specific, kinds of restrictions for the nodes 1a0 and 1a8 which correspond, respectively, to a fixing point and a control point are completely restricted ones, and kinds of restrictions for the remaining nodes 1a1 to 1a7 are completely free ones. However, 1a8 is such as to be displaced by a predetermined amount. Note that in the following description, the node 1a8 corresponding to the control point may often simply be referred to as a control point 1a8, and the node 1a0 corresponding to the fixing point may often simply be referred to as a fixing point 1a0.

Next, in step S4, the microcomputer 21 computes an initial shape 1a according to each of the set values, and in step S5, as shown in FIG. 9A, the computed initial shape 1a is outputted onto the display unit 23. The results of computations are preferably outputted not only to the display but also to the printing unit 24 or recorded onto the recording medium 29. An output image should be expressed, for example, the form of the shape 1a to which the thickness of the wiring harness and shapes of clamps are added. Basically, the initial shape can be computed based on coordinate information included in the restriction conditions.

Note that when values corresponding to an initial loaded load vector and an initial internal force term in the initial shape of the wiring harness of interest are known in advance, these values may be set in this step so as to be captured into the microcomputer 21. In this case, the initial loaded load vector and the initial internal force term are, respectively, initial values of $\{F_O\}$ and $\int [B]^T \sigma_0 dV$ in the expression (1)'.

For example, when wiring harnesses are shipped from a wiring harness manufacturer and is then received by a car manufacturer, those wiring harnesses are shipped and received in a container, and when those wiring harnesses are laid out on cars being assembled, the initial shape, initial loaded load vector and initial internal force term are made to vary depending upon how the wiring harnesses are bent to be contained in the container. By reflecting the initial shape so determined onto a predictive shape as a starting point, a computed predictive shape becomes more realistic.

However, here, the initial shape 1a of the wiring harness is in such a state that the wiring harness is straightened out rectilinearly, and the initial loaded load vector and the initial internal force term are both (including, needless to say, the incremental load vector) set to zero.

Next, in step S6, as shown in FIG. 9A, the control point 1a8 is displaced to, for example, the following point indicated by 1b8. This amount of displacement of the control point 1a8 corresponds to part of elements of $\{\Delta x\}$ in the expression (1)'. The displacement of the control point may be such that 1a8, 1b8, 1c8, 1z8 are registered in advance and an automatic displacement is performed as registered by the microcomputer 21, or the input unit 22 such as a mouse may be used to set as appropriate.

Next, in step S7, the microcomputer 21 computes an incremental displacement vector. The incremental displacement vector corresponds to $\{\Delta x\}$ in the expression (1)'. To add a supplementary explanation, the displacement amount and known value of the control point 1a8 are given to respective elements of the vector $\{\Delta x\}$ so as to obtain values for all the elements of $\{\Delta x\}$ based on the expression (1)'. As this occurs, when the values of $\{\Delta F\}$, $\int [B]^T \sigma_0 dV$ and $\{F_O\}$ contained in the right side member of the expression (1)' are known, those values are given so as to obtain values for all the elements of the vector $\{\Delta x\}$.

For example, in the event that the initial loaded load vector (corresponding to $\{F_O\}$) and the initial internal force term (corresponding to $\int [B]^T \sigma_0 dV$) which correspond to the initial shape are both set to zero (it goes without saying that $\{\Delta F\}$ is also zero), all the elements of the vector $\{\Delta x\}$ are obtained with the right side member of the expression (1)' being made to be zero, whereas in the event that the values of $\{\Delta F\}$, $\int [B]^T \sigma_0 dV$ and $\{F_O\}$ are already computed or set so as to be known, those values are applied to the right side member of the expression (1)' so as to obtain all the elements of the vector $\{\Delta x\}$.

Next, in step S8, the microcomputer 21 computes an internal force term. While the internal force term corresponds to $\int [B]^T \sigma_0 dV$ in the expression (1)', the internal force step can be obtained from the incremental displacement vector $\{\Delta x\}$ that has been computed in the step S7 by making use of a known method.

Next, in step S9, the microcomputer 21 computes an incremental load vector. The incremental load vector corresponds to $\{\Delta F\}$ in the expression (1)'. The incremental load vector $\{\Delta F\}$ can be obtained as a result of an equilibrium state being established between an external force which is a sum of the incremental load vector $\{\Delta F\}$ and the loaded load vector $\{F_O\}$ and the internal force term $\int [B]^T \sigma_0 dV$.

Next, in step S10, the microcomputer 21 computes an intermediate shape 1b in which the finite element model is in a physically balanced or equilibrium state by adding the incremental displacement vector $\{\Delta x\}$ computed in the step S7 to the previous shape, and in step S11, as shown in FIG.

9B, the microcomputer 21 displays the intermediate shape 1$b$ so computed onto the display unit 23. The results of the computation are preferably outputted not only to the display unit 23 but also to the printing unit 24 or recorded onto the recording medium 29. The output image should take, for example, the form of the shape 1$a$ to which the thickness of the wiring harness and shapes of clamps are added.

Then, in step S12, the microcomputer 21 determines whether or not the control point, for example, 1$b$8 has reached a final goal point 1$z$8. If it is determined here that the control point has reached the final goal point 1$z$8 (Y in step S12), the intermediate shape computed in the step S10 is made to be a final shape, and the series of processes is stopped, whereas if the control point has not yet reached the final goal point 1$z$8 (N in step S12), then, proceed to step S13.

In step S13, the microcomputer 21 computes a loaded load vector. While the loaded load vector corresponds to $\{F_0\}$ in the expression (1)', the loaded load vector can be obtained by adding the incremental load vector $\{\Delta F\}$ computed in the step S9 to the current loaded load vector (for example, the initial loaded load vector is zero). Note that the reflection of an influence of the stress or load distributed in the previous shape is understood to have been performed by the processes in the steps S8 and S13.

Then, the flow returns to steps S6, S7, where the microcomputer 21 computes by a similar method to the one that has been described above an incremental displacement vector, internal force term and intermediate shape which correspond to the control point that has been displaced to the following points and outputs what have been so computed. Thus, as shown in FIGS. 9B and 9C, the microcomputer 21 sequentially computes and outputs predictive shapes 1$b$, 1$c$, 1$d$ in which the stresses distributed in the previous shapes is reflected, respectively, until the control point has reached the final goal point 1$z$8.

Note that the nodes 1$b$0, 1$b$1, 1$b$2, 1$b$3, 1$b$4, 1$b$5, 1$b$6 and 1$b$7 in FIG. 9A indicate, respectively, displacements of the nodes 1$a$0, 1$a$1, 1$a$2, 1$a$3, 1$a$4, 1$a$5, 1$a$6 and 1$a$7 which occur as the control point 1$a$8 is displaced to 1$b$8.

In addition, note that the nodes 1$c$0, 1$c$1, 1$c$2, 1$c$3, 1$c$4, 1$c$5, 1$c$6 and 1$c$7 in FIG. 9B indicate, respectively, displacements of the nodes 1$b$0, 1$b$1, 1$b$2, 1$b$3, 1$b$4, 1$b$5, 1$b$6 and 1$b$7 which occur as the control point is displaced from 1$b$8 to 1$c$8.

Additionally, note that the nodes 1$z$0, 1$z$1, 1$z$2, 1$z$3, 1$z$4, 1$z$5, 1$z$6 and 1$z$7 in FIG. 9C indicate, respectively, displacements of the nodes 1$c$0, 1$c$1, 1$c$2, 1$c$3, 1$c$4, 1$c$5, 1$c$6 and 1$c$7 which occur as the control point is displaced from 1$c$8 to 1$z$8.

Note that while, in the processing procedure that has been described, the computing method of the predictive shape when the control point 1$a$8 is forcibly displaced, for example, to 1$b$8, 1$c$8 and 1$z$8 has been illustrated, a computing method of a predictive shape when a predetermined force is applied to the control point 1$a$8 so as to displace the same point will be following the aforesaid processing procedure. In this case, in step S6, instead of displacing the control point forcibly, a predetermined force is applied to the control point to displace the same point. Then, in substantially a similar manner to the method that has been described above, a procedure of computing and outputting incremental displacement vectors, incremental load vectors and intermediate shapes which correspond to the control point that is displaced to the following points by the force applied thereto is repeated until the control point has reached a final goal point. However, when the incremental displacement vector is computed (step S7), an element corresponding to the control point of $\{\Delta F\}$ in the right side member of the expression (1)' becomes a known value instead of an element corresponding to the control point of $\{\Delta x\}$ in the left side member of the expression (1)' becoming an unknown value.

As has been described heretofore, according to the embodiment of the invention, a predictive shape of the wiring harness, in which influence of the stress or load distributed in the previous shape is reflected, is calculated and outputted. For example, the predictive shape 1$b$ is a shape in which the stress distributed in the initial shape 1$a$ is reflected, the predictive shape 1$c$ is a shape in which the stress distributed in the predictive shape 1$b$ is reflected, and the final shape 1$z$ is a shape in which the stress distributed in the predictive shape 1$c$ is reflected. Consequently, according to the embodiment of the invention, the predictive shape of the wiring harness which is closer to the reality can be calculated.

Note that while the embodiment has been described as being applied to the wiring harness that is laid out inside the vehicle as a wiring structure, it goes without saying that the invention can similarly be applied to a hose and a tube that are simpler in construction than the wiring harness and which are laid out outside the vehicle or a general electric wire and a single electric wire. Namely, the wiring structure of the invention is such as to include these hose, tube, general electric wire and single electric wire. In addition, the invention can be applied to a wiring harness having branch wires. Additionally, in addition to the wiring structure having the circular cross section, the invention can be similarly applied to wiring structures having a rectangular cross section, annular cross section, oval cross section, H-shaped cross section and the like. Namely, wiring structures to which the invention is applied are not limited to those having circular cross sections.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2004-202966 filed on Jul. 9, 2004, the contents of which are incorporated herein for reference.

What is claimed is:

1. A method of calculating a predictive shape of a wire structure, comprising:

providing a finite element model of the wire structure, the finite element model being formed as an elastic body having a plurality of linearity beam elements combined at respective joints;

setting physical properties, restriction conditions and loads of the wire structure to the finite element model;

calculating a predictive shape of the finite element model which is in a physically balanced condition based on the physical properties, the restriction conditions and the loads;

outputting the predictive shape of the finite element model;

calculating the loads which are applied to the respective joints of the finite element model at the predictive shape; and displacing a predetermined control point on the finite element model, wherein the predictive shape of the finite element model, in which the control point is displaced, is calculated based on the loads applied to the finite element model prior to the displacement of the control point in the predictive shape calculating process.

2. The method as set forth in claim 1, wherein the control point is forcibly displaced by a predetermined quantity in the displacement process.

3. The method as set forth in claim 1, wherein the control point is displaced by applying a predetermined force to the control point in the control displacement process.

4. The method as set forth in claim 1, further comprising:
obtaining initial loads which are the loads applied to respective joints on a finite element model corresponding to an initial shape of the wiring structure,
wherein the predictive shape of the finite element model, in which the control point is displaced, is calculated based on the initial loads in the predictive shape calculating process.

5. A calculation apparatus for calculating a predictive shape of a wire structure, comprising:
a finite element model creating unit that creates a finite element model of the wire structure, the finite element model being formed as an elastic body having a plurality of beam elements combined at respective joints linearity;
a setting unit that sets physical properties, restriction conditions and loads of the wire structure to the finite element model;
a predictive shape calculating unit that calculates a predictive shape of the finite element model which is in a physically balanced condition based on the physical properties, the restriction conditions and the loads;
an outputting unit that outputs the predictive shape of the finite element model;
a load calculating unit that calculates the loads which are applied to the respective joints of the finite element model at the predictive shape; and
a displacing unit that displaces a predetermined control point on the finite element model,
wherein the predictive shape calculating unit calculates the predictive shape of the finite element model in which the control point is displaced, based on the loads applied to the finite element model prior to the displacement of the control point.

6. A computer-readable recording medium for causing a computer to execute the method of calculating a predictive shape of a wire structure set forth in claim 1.

7. A computer-readable recording medium for causing a computer to execute the method of calculating a predictive shape of a wire structure set forth in claim 2.

8. A computer-readable recording medium for causing a computer to execute the method of calculating a predictive shape of a wire structure set forth in claim 3.

9. A computer-readable recording medium for causing a computer to execute the method of calculating a predictive shape of a wire structure set forth in claim 4.

* * * * *